Dec. 26, 1961  L. KIRCHLER ET AL  3,014,291
HYDRAULIC BOWL LIFTING ARRANGEMENT FOR
EARTH WORKING SCRAPERS
Filed May 11, 1960  2 Sheets-Sheet 1
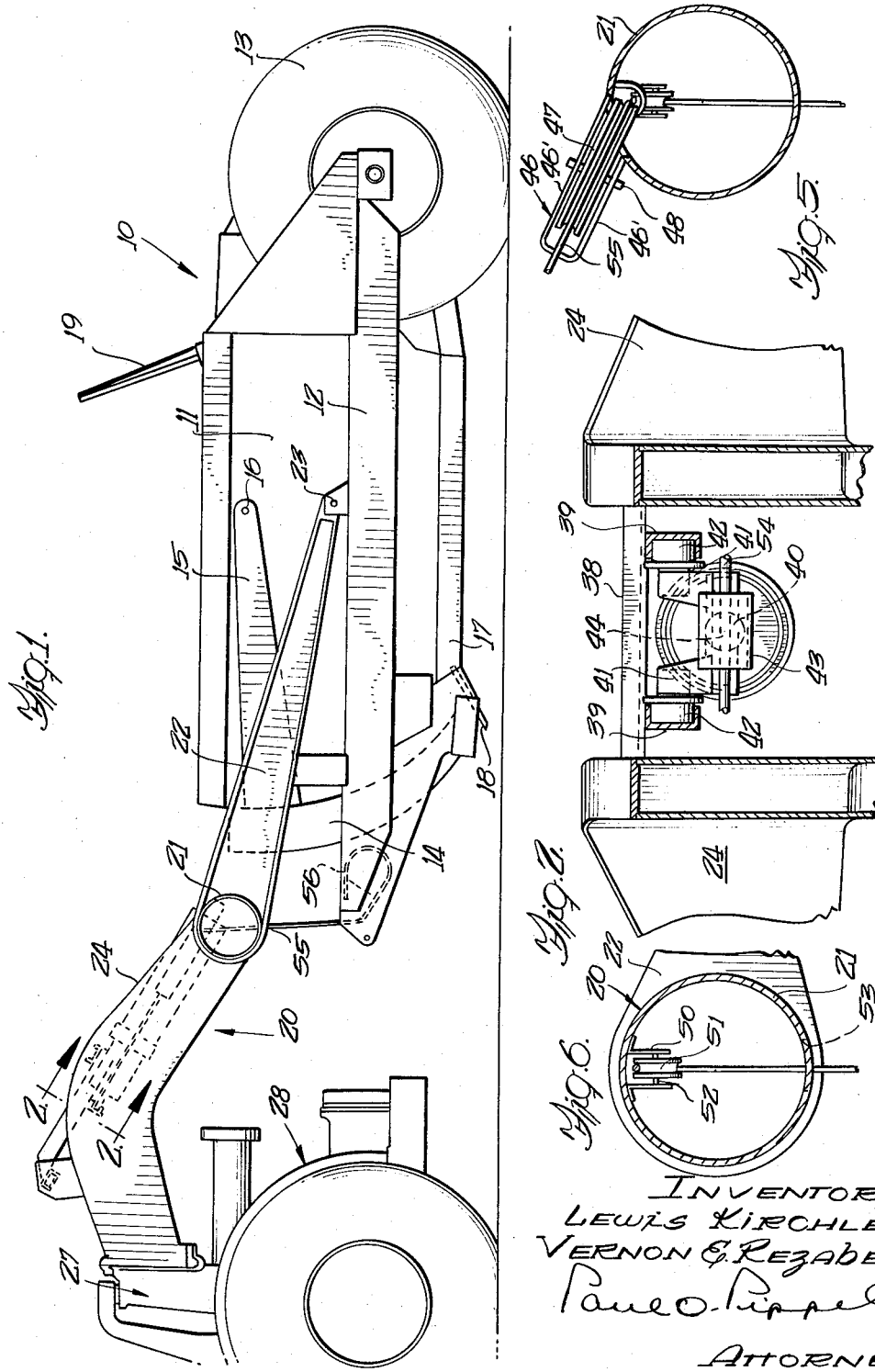
INVENTORS
LEWIS KIRCHLER
VERNON G. REZABEK
Paul O. Pippel
ATTORNEY

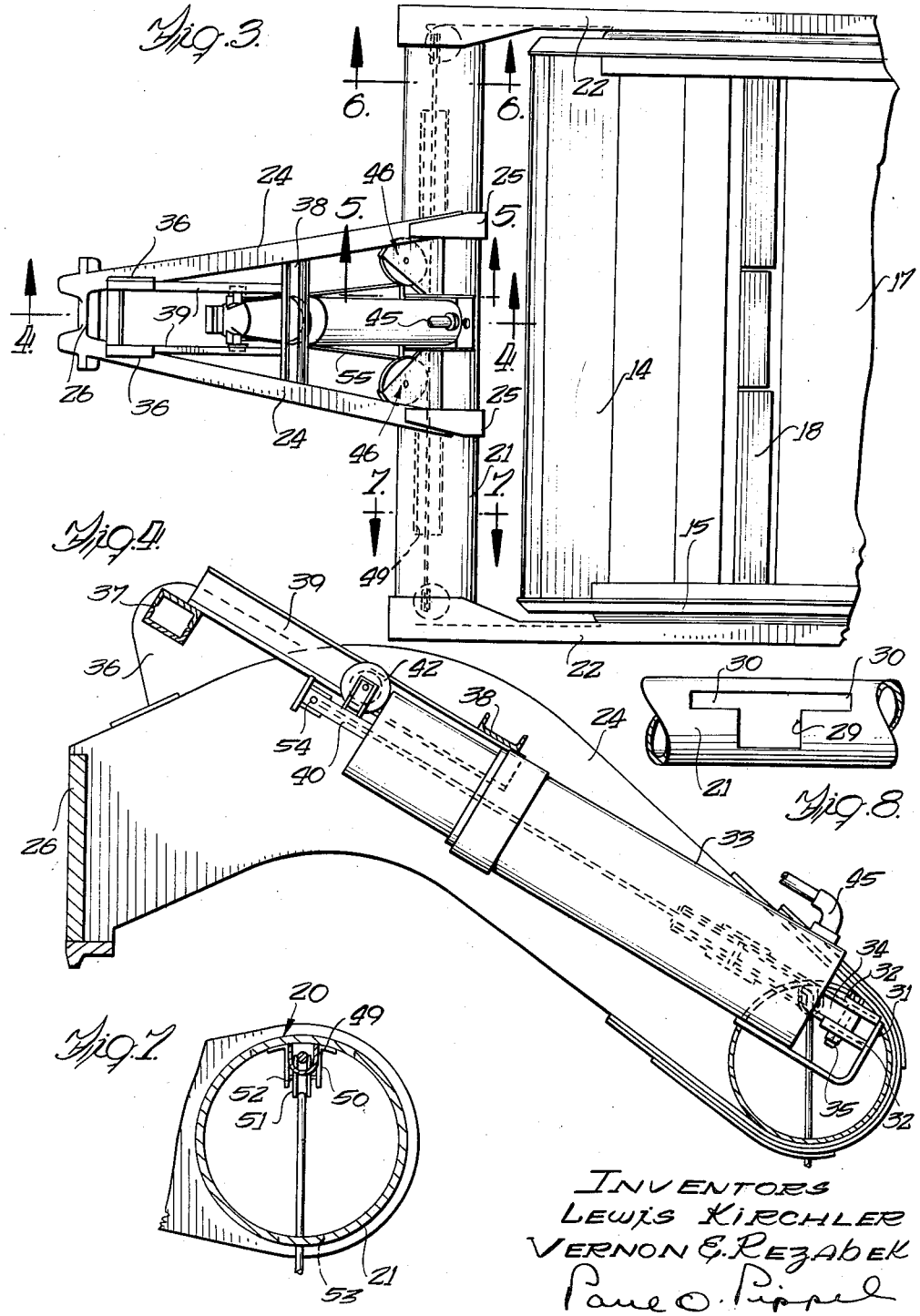

United States Patent Office 3,014,291
Patented Dec. 26, 1961

3,014,291
HYDRAULIC BOWL LIFTING ARRANGEMENT FOR EARTH WORKING SCRAPERS
Lewis Kirchler, Skokie, and Vernon E. Rezabek, Palatine, Ill., assignors to International Harvester Company, Chicago, Ill., a corporation of New Jersey
Filed May 11, 1960, Ser. No. 28,382
4 Claims. (Cl. 37—129)

This invention relates to scrapers and more particularly to an improved hydraulic lifting arrangement for raising and lowering a scraper bowl.

It is a prime object of this invention to provide an improved and simplified hydraulic lifting arrangement for raising and lowering the bowl of a scraper relative to the ground.

A still further object is the provision of an improved hydraulic bowl lifting arrangement including a hydraulic lift system for actuating a cable arrangement to raise and lower the scraper bowl.

A further object of the invention is to provide an improved hydraulic and cable lift system for a bowl, said system including a hydraulic mechanism which is substantially enclosed between the draft members of the scraper to provide for a compact and efficient arrangement.

A more specific object of the invention is the provision of an improved hydraulic and cable lift system for a scraper bowl, the said system including a hydraulic cylinder disposed between the draft arms of the scraper and including attaching means for actuating a cable to raise and lower the scraper bowl.

These and other objects will become more readily apparent from a reading of the description when examined in connection with the accompanying sheets of drawings.

In the drawings:

FIGURE 1 is a side elevational view of a scraper including a draft structure connected to the rear portion of a tractor;

FIGURE 2 is an enlarged cross sectional view taken substantially along the line 2—2 of FIGURE 1;

FIGURE 3 is an enlarged plan view of the forward portion of a scraper bowl including a draft structure connected to the said bowl;

FIGURE 4 is an enlarged cross sectional view taken substantially along the line 4—4 of FIGURE 3;

FIGURE 5 is a detail sectional view taken substantially along the line 5—5 of FIGURE 3;

FIGURE 6 is a detail cross sectional view taken along the line 6—6 of FIGURE 3;

FIGURE 7 is a detail cross sectional view taken along the line 7—7 of FIGURE 3; and FIGURE 8 is a plan view of a central portion of a tubular cross member of a draft structure having certain portions of a lifting mechanism removed to better illustrate a particular structure of the invention.

Referring now particularly to FIGURE 1, a scraper is generally designated by the reference character 10. The scraper 10 comprises a bowl 11 having side frame members 12 and being supported on rear ground wheels 13, only one of which is shown. The bowl 11 is provided at its forward end with an apron 14 having transversely spaced side arms 15 suitably connected for pivotal movement to the bowl by means of pivots 16. The bowl 11 is also provided with a bottom 17 best shown in FIGURE 3. A cutting edge 18 is positioned at the forward end of the bottom 17 and is adapted to be lowered with the bowl into ground engagement in conventional manner. An ejector gate designated at 19, in FIGURE 1, is movable in a forward direction for discharging material from the bowl.

The scraper bowl 11 has connected thereto a draft frame generally designated by the reference character 20. The draft frame 20 comprises a tubular cross member 21 having side booms 22 extending rearwardly with respect to the bowl 11 and being pivotally connected thereto as indicated at 23. The draft frame 20 also includes a suitable "gooseneck" structure which consists of a pair of draft arms 24 extending forwardly in converging relation. The draft arms 24 have their rear ends suitably apertured to extend partially around the tubular cross member 21, and brackets 25, suitably connected around the cross member 21, engage the arms 24 and are secured thereto in conventional manner such as by welding, etc. The forward end of the draft arms 24 are suitably connected by means of a cross member 26 which may be suitably supported on a fifth wheel structure generally designated at 27. The fifth wheel structure 27 is suitably supported on a tractor 28 in conventional manner.

Referring now particularly to FIGURE 8, a central portion of the cross member 21 is indicated and it includes a centrally disposed upper cut-out portion or opening 29 communicating with a pair of laterally extending slots 30 in T-fashion. An L-shaped bracket 31, as best shown in FIGURE 4, may be suitably connected to the cross member 21 by welding within the opening 29. The bracket 31 also has connected thereto forwardly extending ears 32. A fluid cylinder 33 includes a connecting portion 34 which is pivotally connected to the ears 32 by means of a swivel bolt 35. As best shown in FIGURE 4, the forward ends of the draft arms 24 are provided with upwardly extending ears 36 and a tubular cross member 37 is rigidly secured to said ears 36. A cross beam 38 spaced rearwardly of the tubular member 37 is also suitably connected to the draft arms 24. A pair of laterally spaced longitudinally extending track members 39 in the form of channels are connected to the cross beam 38 and member 37. A ram 40, as best shown in FIGURES 2 and 4, is provided at its forward end with a pair of oppositely disposed hangers 41 having pivoted thereon track wheels 42 which are engaged in tracking relation within the tracks 39. The forward end of the ram 40 is provided with a cable connector 43 having a transversely extending bore 44 as shown in FIGURE 2. The fluid cylinder 33 is also provided with a suitable fitting 45 adapted to be connected to a source of fluid under pressure (not shown). A pair of U-shaped brackets 46, as best shown in FIGURE 5, are disposed immediately on opposite sides of the rear end of the fluid cylinder or jack 33. Each U-shaped bracket includes plates 46' which have their lower ends securely welded to portions of the cross member 21 defining the slots 30. Each bracket 46 has a sheave 47 pivoted on a shaft 48. The tubular cross member 21 also includes a pair of cable enclosures 49 of tubular construction which extend outwardly from the central opening 29.

As best shown in FIGURE 6, brackets 50 are provided on opposite ends of the tubular cross member 21 and each bracket has pivotally connected thereto a sheave 51 rotatable on a shaft 52. Immediately below each sheave 51, there is provided in the cross member 21, an opening 53.

A cable is designated at 54, the said cable as shown in FIGURE 2, extending through the bore 44 in sliding relation. The cable 54 includes opposite portions 55 which as shown in FIGURES 3 and 5 extend to the sheaves 47 and around said sheaves through the enclosures 49, over the sheaves 51 and downwardly through the openings 53. The end portions of the cable 54 are suitably cinched as indicated at 56 in a conventional manner to forwardly extending portions of the side frame members 12.

*The operation*

The operation of the scraper is conventional in that the apron 14 is raised to an open position when the bowl is lowered so that the cutting edge 18 engages the ground for loading of the bottom 17. During the transport position, the apron 14 is closed and when it is desired to discharge material from the bowl, the apron 14 is opened by suitable raising and lowering means (not shown) and the gate 19 is actuated to eject the load.

In the lowering and raising of the bowl, fluid under pressure is directed through the connection 45 to the fluid cylinder 33 whereupon the ram 40 moves forwardly. The wheels 42 suitably confine the ram and guide it in its movement so that it moves positively in a forward direction and outwardly with respect to the cylinder 33. As the ram 40 is moved in an outward direction, the cable 54 moves in a manner forwardly whereupon the end portions of the cable, which are attached to the frame members 12, raise the bowl out of engagement with the ground. Equalization of opposite ends of the cable is accomplished since the cable 54 may slide in the bore 44 thus centering itself during operation.

When it is desired to lower the bowl, suitable valving (not shown) permits fluid to leave the cylinder 33 through the connection 45 whereupon by gravity the bowl is lowered and the ram is returned to its original position as shown in FIGURES 3 and 4.

The fluid cylinder 33 and tracks 39 are disposed between and below the upper and lower edges of the draft arms 24. Thus the silhouette of the scraper is clean and the raising and lowering mechanism, mainly the fluid cylinder, is amply protected against damage since it is disposed substantially completely between the said draft arms 24. By recessing or providing the opening and slots in the cross member it is possible to locate the cylinder as indicated, within the space defined by the draft arms 24. Also the cable reeving is very precise and simple so that maintenance problems are reduced. Furthermore the cable is protected by means of the tubular enclosures 49 within the cross member 21.

It is apparent that a greatly simplified cable reeving arrangement and hydraulic actuating means for raising and lowering a scraper bowl have been provided. Thus the objects of the invention have been fully achieved and it must be realized that changes and modifications may be made which do not depart from the spirit of the invention as disclosed or from the scope thereof as defined in the appended claims.

What is claimed is:

1. An earth-moving scraper comprising a scraper bowl, a draft frame connected to said bowl, said draft frame including a transversely extending tubular draft member, means pivotally connecting said draft member to said bowl, a pair of draft arms connected to said draft member, and extending forwardly with respect thereto in converging relation, bowl lifting means including a fluid jack disposed between said draft arms, said tubular draft member having a centrally disposed upper opening including laterally extending slots adjacent opposite sides of said opening, a bracket connected to said draft member and recessed within said central opening, means connecting said jack to said bracket, a ram reciprocally positioned on said jack, said ram having at one end an opening, a pair of transversely spaced track members supported between said draft arms, guide members on said ram supported on said tracks, a cable reeving arrangement including a pair of first sheaves, brackets connected to said tubular draft member on opposite sides of said jack adjacent said slots, first sheaves rotatably supported on said brackets, tubular enclosure members within said tubular draft member extending laterally outwardly from said slots, said tubular draft member having a pair of lower openings at opposite ends thereof, second sheaves on said tubular draft member adjacent said lower openings, a cable slidably connected within the opening of said ram, said cable extending around said first sheaves through said enclosures, over said second sheaves and downwardly through said lower openings, said cable having end portions connected to said bowl whereby during reciprocation of said ram said bowl may be raised and lowered.

2. An earth-moving scraper comprising a scraper bowl, a draft frame connected to said bowl, said draft frame including a transversely extending tubular draft member, means pivotally connecting said draft member to said bowl, a pair of draft arms connected to said draft member, bowl lifting means including a fluid jack disposed between said draft arms, said tubular draft member having a centrally disposed upper opening including laterally extending slots adjacent opposite sides of said opening, a bracket connected to said draft member and recessed within said central opening, means connecting said jack to said bracket whereby a rear portion of said jack is recessed within said opening, a ram reciprocally positioned on said jack, said ram having at one end an opening, a pair of transversely spaced first guide members supported between said draft arms, second guide members on said ram supported on said first guide members, a cable reeving arrangement including a pair of first sheaves, brackets connected to said tubular draft member on opposite sides of said jack adjacent said slots, first sheaves rotatably supported on said brackets, tubular enclosure members within said tubular draft member extending laterally outwardly from said slots, said tubular draft member having a pair of lower openings at opposite ends thereof, second sheaves on said tubular draft member adjacent said lower openings, a cable slidably connected within the opening of said ram, said cable extending around said first sheaves through said enclosures, over said second sheaves and downwardly through said lower openings, said cable having end portions connected to said bowl whereby during reciprocation of said ram said bowl may be raised and lowered.

3. An earth-moving scraper comprising a scraper bowl, a draft frame connected to said bowl, said draft frame including a transversely extending tubular draft member, means pivotally connecting said draft member to said bowl, a pair of draft arms connected to said draft member, bowl lifting means including a fluid jack disposed between said draft arms, said tubular draft member having a centrally disposed upper opening including laterally extending slots adjacent opposite sides of said opening, means connecting one end of said jack to said draft member within said upper opening, a ram reciprocally positioned on said jack, said ram having at one end a guide element, a pair of transversely spaced track members supported between said draft arms, guide members on said ram supported on said tracks, a cable reeving arrangement including a pair of first sheaves, brackets connected to said tubular draft member on opposite sides of said jack adjacent said slots, first sheaves rotatably supported on said brackets, said tubular draft member having a pair of lower openings at opposite ends thereof, second sheaves on said tubular draft members adjacent said lower openings, a cable slidably connected to said guide element of said ram, said cable extending around said first sheaves, over said second sheaves and downwardly through said lower openings, said cable having end portions connected to said bowl whereby during reciprocation of said ram said bowl may be raised and lowered.

4. An earth-moving scraper comprising a scraper bowl, a draft frame connected to said bowl, said draft frame including a transversely extending tubular draft member, means pivotally connecting said draft member to said bowl, a pair of draft arms connected to said draft member, bowl lifting means including a fluid jack disposed between said draft arms, said tubular draft member having an upper opening, means connecting one end of said jack to said tubular draft member within said opening, a ram reciprocally positioned on said jack, said ram having at one end a guide element, a pair of transversely spaced first guide members supported between said draft arms, guide members on said ram movably supported on said first guide members, a cable reeving arrangement including a pair of first sheaves, brackets connected to said tubular draft member on opposite sides of said jack, first sheaves rotatably supported on said brackets, said tubular draft member having a pair of lower openings at opposite ends thereof, second sheaves on said tubular draft members adjacent said lower openings, a cable slidably connected to said guide element of said ram, said cable extending around said first sheaves, over said second sheaves and downwardly through said lower openings, said cable having end portions connected to said bowl whereby during reciprocation of said ram said bowl may be raised and lowered.

References Cited in the file of this patent

UNITED STATES PATENTS

| | | |
|---|---|---|
| 2,052,182 | Le Bleu | Aug. 25, 1936 |
| 2,565,850 | Hyler | Aug. 28, 1951 |
| 2,763,942 | Adams | Sept. 25, 1956 |
| 2,852,871 | Kirchler | Sept. 23, 1958 |
| 2,931,112 | Wilkinson | Apr. 5, 1960 |